(12) United States Patent
Bruno et al.

(10) Patent No.: US 8,593,470 B2
(45) Date of Patent: Nov. 26, 2013

(54) DYNAMIC MEMORY CLOCK SWITCHING CIRCUIT AND METHOD FOR ADJUSTING POWER CONSUMPTION

(75) Inventors: John Bruno, Scarborough (CA); Erwin Pang, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 1456 days.

(21) Appl. No.: 10/906,559

(22) Filed: Feb. 24, 2005

(65) Prior Publication Data

US 2006/0187226 A1   Aug. 24, 2006

(51) Int. Cl.
G06F 13/372 (2006.01)

(52) U.S. Cl.
USPC ........................................................ 345/534

(58) Field of Classification Search
USPC ............ 345/10, 428, 519, 520, 534; 710/260, 710/305; 711/167; 713/260, 300, 320, 322, 713/323, 340, 500, 502, 503, 600, 601, 713/501; 365/222
See application file for complete search history.

(56) References Cited

U.S. PATENT DOCUMENTS

| | | | | |
|---|---|---|---|---|
| 5,729,720 A * | 3/1998 | Kau et al. | ...................... | 713/500 |
| 6,040,845 A * | 3/2000 | Melo et al. | ..................... | 345/520 |
| 6,079,022 A * | 6/2000 | Young | ........................... | 713/300 |
| 6,079,025 A * | 6/2000 | Fung | ............................ | 713/323 |
| 6,151,681 A * | 11/2000 | Roden et al. | .................. | 713/322 |
| 6,323,713 B1 * | 11/2001 | Yuzue | ........................... | 327/291 |
| 6,460,125 B2 * | 10/2002 | Lee et al. | ..................... | 711/167 |
| 6,657,634 B1 * | 12/2003 | Sinclair et al. | ................ | 345/534 |
| 6,820,209 B1 * | 11/2004 | Culbert et al. | ................ | 713/501 |
| 6,836,848 B2 * | 12/2004 | Yu et al. | ......................... | 713/300 |
| 6,950,105 B2 * | 9/2005 | Giemborek et al. | .......... | 345/501 |
| 7,000,065 B2 * | 2/2006 | Wilcox et al. | ................. | 711/105 |
| 7,007,175 B2 * | 2/2006 | Chang et al. | .................. | 713/300 |
| 7,028,200 B2 * | 4/2006 | Ma | ................................ | 713/324 |
| 7,036,032 B2 * | 4/2006 | Mizuyabu et al. | ............ | 713/323 |
| 7,073,082 B2 * | 7/2006 | Hsu | ............................... | 713/323 |
| 7,093,153 B1 * | 8/2006 | Witek et al. | ................... | 713/600 |
| 7,114,086 B2 * | 9/2006 | Mizuyabu et al. | ............ | 713/320 |
| 7,315,957 B1 * | 1/2008 | Wagner et al. | ................ | 713/501 |
| 2001/0012230 A1 * | 8/2001 | Takemae et al. | .............. | 365/222 |
| 2003/0128198 A1 * | 7/2003 | Mizuyabu et al. | ............ | 345/204 |
| 2003/0210247 A1 * | 11/2003 | Cui et al. | ...................... | 345/534 |
| 2004/0039954 A1 * | 2/2004 | White et al. | .................. | 713/322 |
| 2004/0139359 A1 * | 7/2004 | Samson et al. | ................ | 713/320 |
| 2004/0236896 A1 * | 11/2004 | Kanapathippillai et al. | .. | 711/100 |
| 2004/0243858 A1 * | 12/2004 | Dennis et al. | ................. | 713/300 |

(Continued)

*Primary Examiner* — Jeffrey Chow

(74) *Attorney, Agent, or Firm* — Faegre Baker Daniels LLP

(57) ABSTRACT

A power adjustment circuit includes memory controller logic that is couplable to system memory or other memory if desired. The memory control logic is operative to provide a variable memory clock signal to the system memory and to place the system memory in a self refresh mode wherein the self refresh mode does not require a memory clock signal. Thereafter, the memory clock control logic adjusts the frequency of the memory clock signal to a lower (or higher) frequency clock signal, and in response to the frequency of the memory clock signal becoming stable, the memory clock control logic restores the memory to a normal mode using the lower adjusted frequency memory clock signal. As such, a dynamic memory clock switching mechanism is employed for quickly varying the frequency of memory modules for discrete graphics processors, graphics processors integrated on a chip, or any other processors such that the memory clock can be reduced to a lower frequency in real time to save power.

20 Claims, 5 Drawing Sheets

(56) References Cited

U.S. PATENT DOCUMENTS

| | | | |
|---|---|---|---|
| 2005/0195181 A1* | 9/2005 | Khodorkovsky | 345/211 |
| 2005/0289369 A1* | 12/2005 | Chung et al. | 713/300 |
| 2005/0289377 A1* | 12/2005 | Luong et al. | 713/322 |
| 2006/0020835 A1* | 1/2006 | Samson et al. | 713/300 |
| 2006/0031690 A1* | 2/2006 | Chung et al. | 713/300 |

* cited by examiner

DYNAMIC MEMORY CLOCK SWITCHING CIRCUIT AND METHOD FOR ADJUSTING POWER CONSUMPTION

FIELD OF THE INVENTION

The invention relates generally to methods and apparatus for saving power such as on mobile devices and non-mobile devices, and more particularly to methods and circuits for reducing power consumption in systems that employ memory.

BACKGROUND OF THE INVENTION

Saving power for mobile devices such as laptops, handheld devices and other devices are known which, for example, reduce overall system power consumption by reducing a memory clock that is controlled to run at a lower frequency such as when a laptop system is disconnected from an AC supply and operates in a battery mode. The memory clock may be provided, for example, by a phase lock loop circuit located on a graphics controller chip or any other suitable chip and provides clock and strobe pulses and other information to a memory chip, such as a DDRRAM, ROM or any other suitable memory. Memory clock frequency is typically reduced in connection with determining that a memory bandwidth requirement is at a low level, for frame buffer memories.

However, reducing a clock by reprogramming a phase lock loop circuit can typically require the use of a delay lock loop on a memory chip as well as a corresponding delay lock loop circuit on a graphics controller, or other suitable integrated circuit. For example, the delay lock loop on the graphics controller may be used to delay a STROBE signal when used for example in a double data rate RAM or any other suitable memory to compensate for delays on a circuit board or on other substrates. For example, controlling of such memory clock frequencies typically requires the need to wait for the DLLs to lock. There are typically DLLs on both the source chip that provides the memory clock such as a graphics controller, and in the memory element such as the RAM chip, ROM chip or any other suitable memory chip.

However, when system memory also contains the frame buffer used by graphics controller and the system memory clock is changed, the system runs the risk of locking up completely since the host processor also accesses the system memory.

In one example, a known method includes stopping memory access clients from making memory requests prior to changing the frequency of the memory clock that is supplied to the memory chip. Moreover, such power reduction systems typically are carried out by a host processor under the control of a software driver and the software driver may be too slow to program all of the registers necessary to change the memory clock to allow the DLLs to relock within one frame or refresh cycle. As a result, a user can see a flash on the screen.

Another problem can arise where a processor, such as a graphics controller, or other suitable processor is integrated in a memory bridge circuit, such as a north bridge circuit. In such systems, the system memory also contains the frame buffer used by the graphics controller to output pixel information for display on a display device. Prior methods would stop all memory requests and can result in a killed system since system memory requests are also stopped. As such, when client memory access are stopped, data being written for example may be corrupted causing the entire system to potentially lock up.

It is also known for memory chips to have a soft refresh mode which effectively shuts down the chip so that it need not employ an external memory clock but still retains and saves data. However, such a self refresh mode is not typically used in prior art clock frequency control based power reduction circuits.

Accordingly, a need exists to overcome one or more of the above deficiencies.

DETAILED DESCRIPTION OF THE DRAWINGS

The invention will be more readily understood in view of the following description when accompanied by the below figures and wherein like reference numerals represent like elements:

DETAILED DESCRIPTION OF THE PREFERRED EMBODIMENT

Briefly, a power reduction circuit includes memory controller logic that is couplable to system memory. The memory control logic is operative to provide a variable memory clock signal to the system memory and to place the system memory in a self refresh mode wherein the self refresh mode does not require a memory clock signal. Thereafter, the memory clock control logic adjusts the frequency of the memory clock signal to a different frequency clock signal, and in response to the frequency of the memory clock signal becoming stable, the memory clock control logic restores the memory to a normal mode using the different frequency memory clock signal. Adjusting the frequency of the memory clock signal includes reducing or increasing the frequency as needed. In one embodiment a reduction in frequency is used to reduce power consumption. As such, a dynamic memory clock switching mechanism is employed for quickly varying the frequency of memory modules for discrete graphics processors, graphics processors integrated on a chip, or any other processors such that the memory clock can be reduced to a lower frequency in real time to save power. The memory modules are put into a self refresh mode before clock switching takes place. Upon receiving the memory request, the memory modules may be reduced to a lower frequency after entering the self refresh mode. The memory modules are then woken up from the self refresh mode after the clock frequency is switched. The switching sequence is controlled, in one embodiment, by hardware in real time and is transparent to core logic, such as a graphics processing core or any other suitable logic.

In one embodiment, the memory controller logic includes a register set wherein one register is programmed with a current memory clock frequency and another register is pre-programmed with a lower clock frequency prior to detecting that a power reduction condition exists. When a power reduction condition is detected, such as through a host processor executing a driver, or through suitable hardware circuitry, the lower clock frequency setting is employed and a memory clock control sequence, as described above, is carried out. To enter the self refresh mode, as known in the art, commands are written to the memory chip and, for example, a clock enable signal may be toggled to cause the memory to go into a self refresh mode. During such a self refresh mode, no memory clock signal is required, but the memory still maintains the data so that the memory is self refreshed. However, other advantages will be recognized by those of ordinary skill in the art.

In another embodiment, the memory controller logic is employed in an integrated memory bridge circuit that includes an integrated graphics controller portion in combination with memory controller logic. The memory is off chip to the integrated memory bridge circuit.

Figure 1:
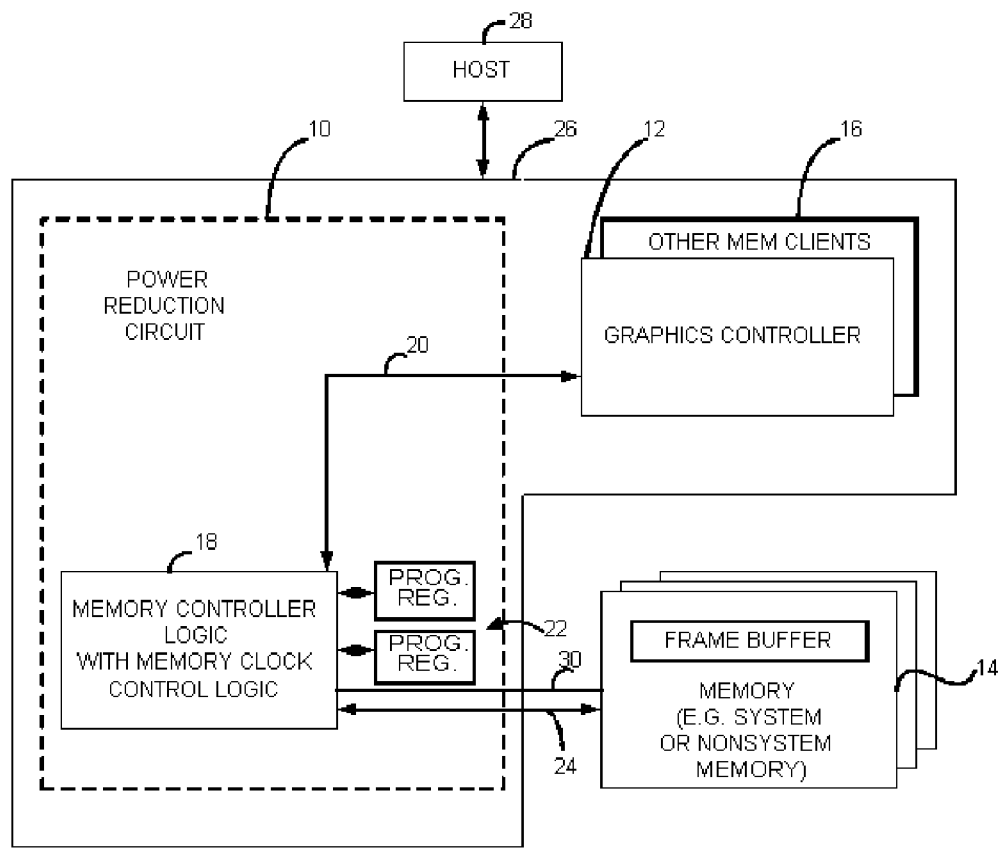
FIG. 1 illustrates one example of a block diagram illustrating one example of a power reduction circuit in accordance with one embodiment of the invention.

FIG. 1 is a block diagram illustrating one example of a power reduction circuit 10, in this embodiment employed on a mobile device wherein the mobile device employs a graphics controller 12 that uses at least a portion of system memory 14 as frame buffer memory. However, it will be recognized that the power reduction circuit 10 may be employed in any suitable system and that the memory 14 may be non-system memory if desired. The graphics controller 12 may be one of many other memory clients 16 that request access to memory 14 to either write data to memory or read data from memory.

The power reduction circuit 10 may be employed using any suitable structure including, but not limited to, discrete logic, one or more processing devices that executes firmware or software stored in memory in the form of executable instructions, or any suitable combination thereof. In this example, the power reduction circuit 10 includes memory controller logic 18 which is operatively coupled to the graphics controller 12 through one or more suitable buses 20. In this example, the power reduction circuit 10 also includes a register set generally indicated as 22 which are programmable through a suitable bus by, for example, a host processor executing a software driver application (not shown). The memory controller 18 is suitably coupled to the memory 14 through any suitable link or bus structure 24.

In this example, the graphics controller 12 and power reduction circuit 10 are circuits integrated in a memory bridge circuit 26 that may interface with a host processor, such as any suitable coprocessor 28 and may be used to access the memory 14 for the host processor 28. However, it will be recognized that any suitable configuration may be used.

In this example, the memory controller logic 18 includes memory clock control logic that is operative to provide a variable memory clock signal 30 to the memory 14 and to place the memory 14 in a self refresh mode through writing suitable commands and toggling, for example, a clock enable input on the memory chip 14. The self refresh mode, as known in the art, does not require a memory clock signal when in a refresh mode. The memory clock control logic is also operative to then reduce a frequency of the memory clock signal 30 to a lower frequency clock signal and when the lower memory clock signal 30 becomes stable, the memory clock control logic then restores the memory 14 to a normal mode that requires a lower frequency memory clock signal 30.

Figure 2:
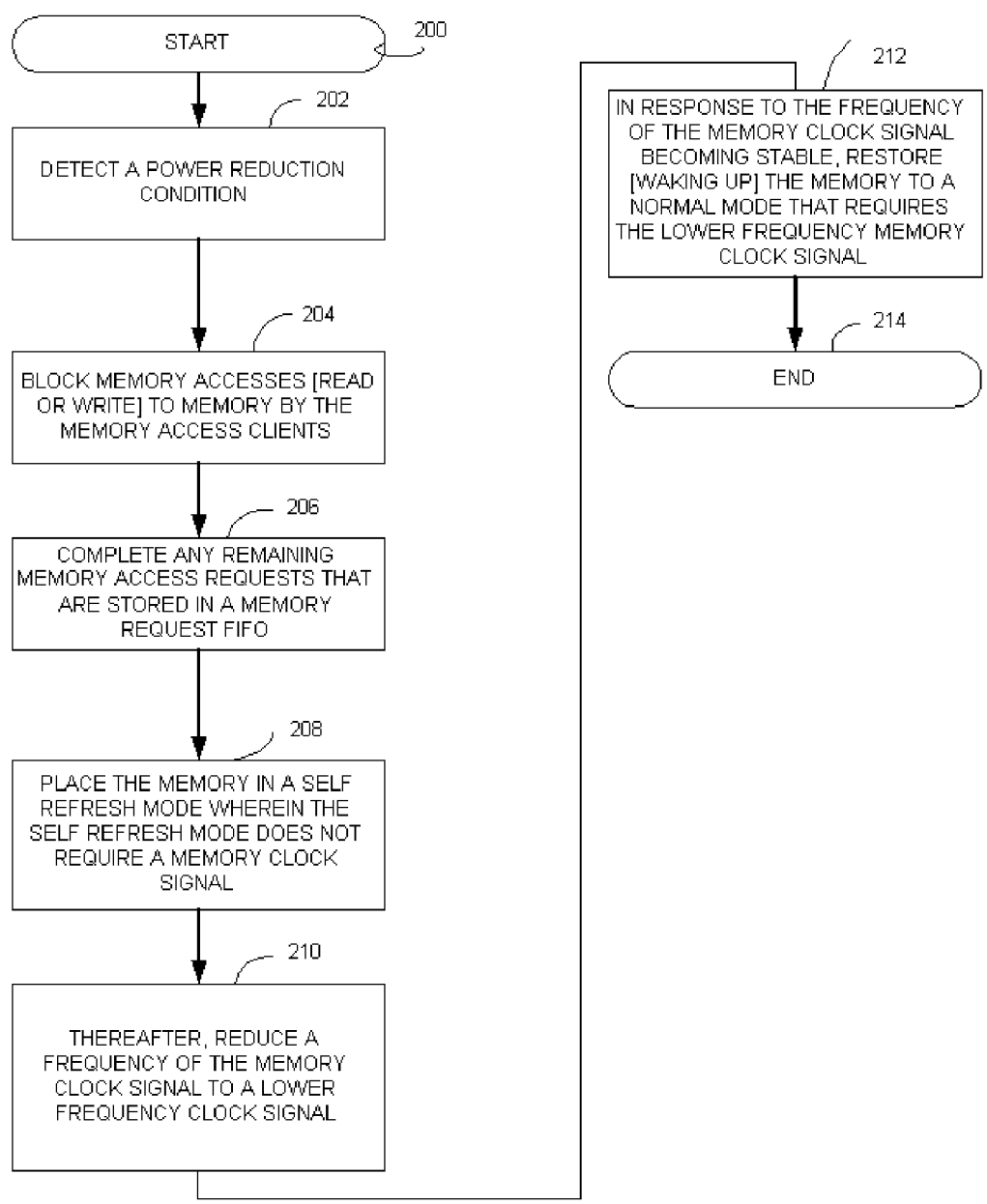
FIG. 2 is a flowchart illustrating one example of a method for reducing power consumption in a mobile device in accordance with one embodiment of the invention.

FIG. 2 illustrates one example of a method for reducing power consumption in a mobile device which starts in block 200. As shown in block 202, the method includes detecting a power reduction condition. This may be done, for example, by the host processor 28 executing a driver application stored in memory 14 or any other suitable location and detects, for example, when a battery condition has occurred, such as when the power is removed from an AC source to a DC source. Another suitable power reduction condition may also be used such as, for example, when a keyboard has not been accessed for a period of time, or any other suitable condition as known in the art. In one embodiment, the power reduction condition may be performed by hardware as part of the memory controller logic which may monitor memory access requests by each of the various memory clients to determine the bandwidth needed for memory on a real time basis. However, it will be recognized that any suitable power reduction condition detection logic may also be used.

As shown in block 204, the method includes blocking memory accesses to the memory 14 by the memory access clients. This may include, for example, the memory controller logic blocking read or write requests by the memory clients 16 or graphics controller 12 since the interface between the memory controller and its clients uses a handshaking to determine if requests can be serviced. If the memory controller is ready to accept requests, transactions can go on. Otherwise, the transactions will stall until the memory controller has bandwidth to continue. As shown in block 206, the method includes completing any remaining memory access requests that are stored in a memory request FIFO. For example, as known in the art, a memory request FIFO stores the memory requests for a given client. The FIFO may be completely serviced so that all remaining memory requests that have not been blocked are carried out. Once the remaining memory access requests have been serviced, the method includes, as shown in block 208, placing the memory 14 in a self refresh mode wherein the self refresh mode does not require a memory clock signal. As such, this may include, for example, the memory controller logic carrying out a memory chip self refresh sequence to place the memory 14 in a memory self refresh mode. As shown in block 210, thereafter, the method includes reducing the frequency of the memory clock signal to the memory, to a lower frequency clock signal. This is shown in block 210. This may be done, for example, by the memory controller logic setting the clock frequency to the value indicated in the preloaded frequency setting register of the register set 22.

As shown in block 212, in response to the frequency of the memory clock signal becoming stable, the method includes restoring or waking up the memory, to a normal mode that requires (e.g. uses) a lower frequency memory clock signal. This is shown in block 212. As shown in block 214, the method then ends or continues on a repetitive basis for each detected power reduction condition. As such, the memory frequency control is performed on a dynamic basis. The memory 14 may be any suitable memory such as DDRRAM, ROM, or any other suitable integrated memory element that operates in a self refresh mode.

Figure 3:
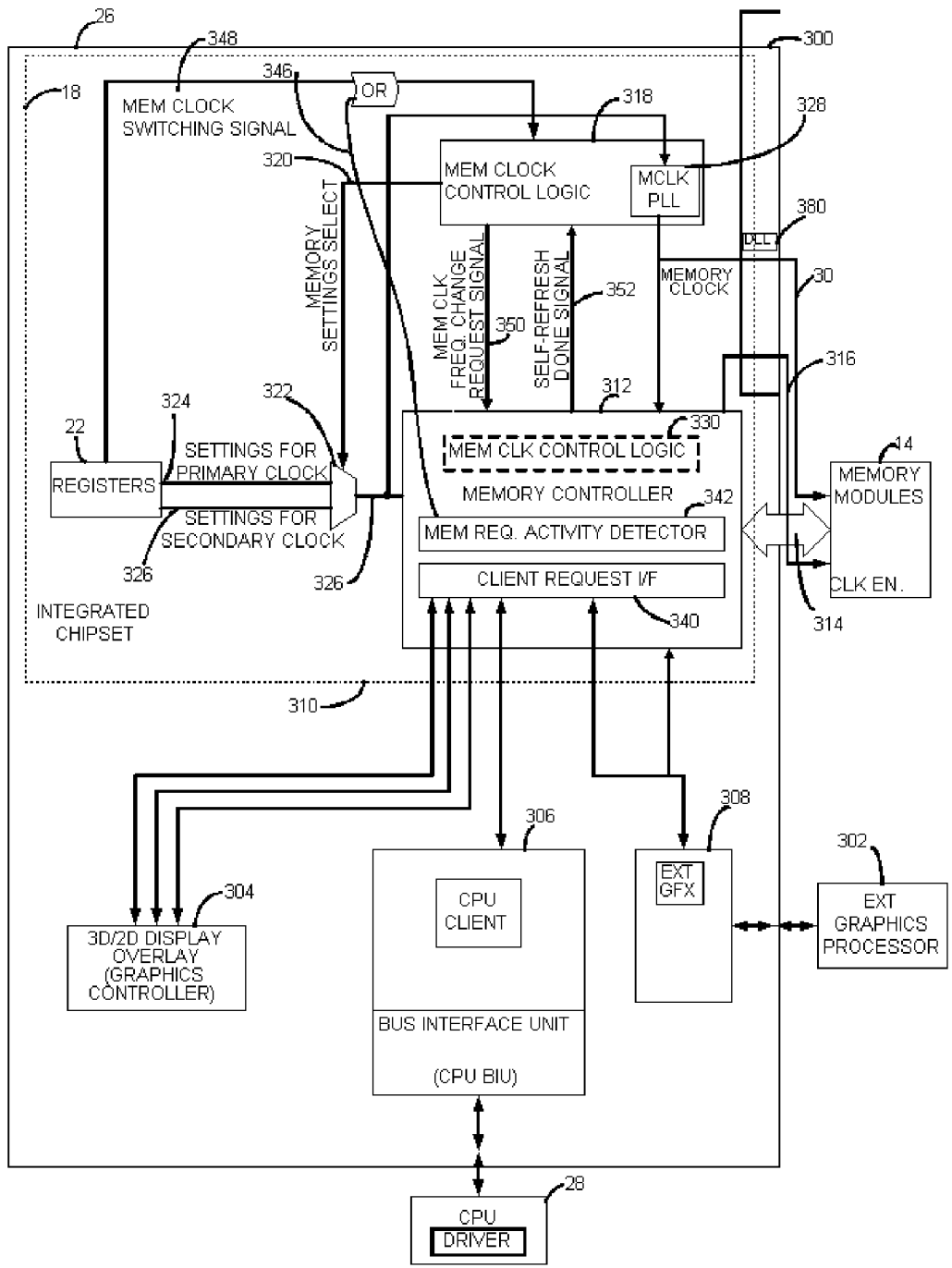
FIG. 3 is a block diagram illustrating one example of a system that employs a power reduction circuit in accordance with one embodiment of the invention.

FIG. 3 is a block diagram illustrating one example of a power reduction circuit 10 employed on an integrated memory bridge circuit 300. The integrated memory bridge circuit 300 may be, for example, a northbridge integrated circuit, or any other suitable memory bridge circuit that provides, for example, an access bridge to memory 14 for the host processor 28 or other external processors such as external graphics controller 302, or any other suitable peripheral devices, cards, or circuits, as desired. In this embodiment, the integrated memory bridge circuit is an integrated die. However, it will be recognized that multiple dies can be employed if desired.

In this example, the integrated memory bridge circuit 300 includes an integrated graphics controller portion 304 that may be any conventional graphics controller circuit and in this example includes a 3D rendering engine that uses at least a portion of the system memory 14 as frame buffer memory and also includes a 2D graphics rendering engine that uses the memory 14 as frame buffer memory, and also includes display engine logic to control display of information on a suitable display device. Other functions are also employed by conventional graphics controllers as known in the art, but are not shown herein for purposes of simplicity. The integrated memory bridge circuit 300 also includes a central processing unit client logic 306 and, if desired, other external graphics controller logic 308, which serves as another memory client to access memory 14. The CPU client logic 306 includes a bus interface unit to allow the host processor 28 to act as a memory request engine or memory request client for reading and writing information to system memory 14. As such, suitable communication links generally shown as 310 operatively couple the memory clients 304, 306 and 308 to memory controller 312 which, in this example, is shown as being coupled to the memory 14 through a suitable bus 314 and also provides suitable control memory enable data 316 such as clock enable control data to control a clock enable input on the memory module 14 to place the memory in self refresh mode. The memory module 14 is also operatively coupled to receive the memory clock signal 30 from memory clock control logic 318.

As such, the integrated memory bridge circuit 300 includes memory controller logic 18 that is operatively coupled to the integrated graphics controller 304, and other memory clients, and includes memory clock control logic 318 that provides a variable memory clock signal 30 to the memory and places the memory 14 in a self refresh mode by, for example, carrying out a memory chip self refresh sequence by writing suitable commands and controlling the clock enable input in a manner so as to put the memory modules 14 in a self refresh mode. The data in the memory gets self refreshed and the memory self refresh mode does not require a memory clock signal. The memory clock control logic 318 is also operative to reduce a frequency of the memory clock signal 30 to a lower frequency clock signal by, for example in this embodiment, generating a memory setting select signal 320 that controls a multiplexer 322 so that multiplexer 322 passes either a current memory clock frequency setting 324 or a next, and in this example lower, memory clock frequency setting 326 as defined by the control bits in the registers 22. As such, the multiplexer 322 will output a memory clock control signal 326 which suitably programs the memory clock PLL 328 to the desired memory clock frequency.

In this example, the memory clock control logic 318 is shown to be external to the memory controller 312. However, it will be recognized that, as described herein, any suitable circuit may be incorporated within any other suitable circuit as desired. For example, as shown by dashed lines 330, the memory clock control logic 318 may be suitably integrated in the memory controller block as well. In this example, the memory clock control logic 318 is a state machine that carries out the operations as described herein. The memory clock control logic 318, in response to the frequency of the memory clock signal 30 becoming stable, restores the memory 14 to a normal mode that uses the lower frequency memory clock signal. This may be done, for example, by suitably signaling the memory controller 312 to disengage the memory module 14 from its self refresh mode. For example, the memory controller 312 may include suitable timeout circuitry to allow the memory clock signal 30 to become stable and then communicate with the memory to wake up out of the self refresh mode by initiating a command sequence to wake up the memory 14 to operate in normal mode. However, any suitable technique may be used.

In this example, the memory controller includes client request interface logic 340 which receives memory requests from the various memory clients. The client request interface logic 340 may include suitable memory request FIFOs associated with each of the clients or one FIFO for all clients, or any other suitable memory request FIFO structure as desired. Also in this example, the memory controller 312 includes the memory request activity detector logic 342 which is operatively coupled to the memory request FIFOs to determine the number of memory read or writes pending for a given client and then may determine the level of memory activity on a real time basis if desired. As such, when the memory request activity detector 342 determines that the memory accesses to memory are low enough for a reduction of memory clock frequency, the memory request activity detector may then generate a memory clock change signal 346 to activate the clock control logic 318 to begin the memory clock reduction process. However, it will be recognized that the memory request activity detector 342 may be implemented in hardware or in software through a driver executing on the CPU (a software based memory request activity detector) to detect memory bandwidth requirements in any suitable manner.

In another embodiment, the register set 22 may also include a control register bit that may be writable by the host processor 28 to activate the memory clock control logic 318 to reduce the memory clock as described above under control of the software driver. As such, in this embodiment, the memory clock switching signal 348 is provided through a register control bit or bits. Alternatively, the memory request activity detector 342 may also suitably write to a control register to activate the memory clock logic 318 to begin the memory clock frequency reduction sequence.

As described above, the memory clock control logic 318 is operative to carry out a memory chip self refresh sequence with the system memory 14 to put the system memory 14 into a self refresh mode. The register set 22 is programmable and contains current clock frequency data and preloaded lower clock frequency data and includes a selection circuit such as multiplexer 322 operatively coupled to the register set 22 and operative to select a lower frequency clock signal for controlling the system memory via the memory setting select signal 320. As described above, the lower clock frequency data is preloaded into the register set prior to determining that a frequency change is desired. Preloading of the memory clock frequency data allows for a faster transition to a stable clock frequency, among other advantages. As described, the memory request activity determination logic 342 determines whether memory request clients are requesting access to the system memory 14 at a level that allows power consumption reduction for the system memory. Also in this example, the memory clock control logic 318 includes a memory clock source such as a programmable phase lock loop circuit 328 that is programmable based on the lower clock frequency data in the register set 22 and is programmable with the primary clock setting data also.

The memory control logic 318 also generates a memory clock frequency change request data 350 to the memory controller 312 in response to a power reduction event and, in this example, in response to the memory clock switching signal 348 or 346. The event may also be a battery detection mode that causes the memory clock switching signal 348 or 346 to be activated. The memory control logic 318 also receives data 352 indicating that a self refresh mode of the system memory 14 has been properly entered. This is provided, for example, by the memory controller 312 which causes the memory 14 to enter the self refresh mode. In response to the data indicating that the memory 14 is in the self refresh mode, the memory control logic then reduces the frequency of the memory clock signal by controlling the memory clock PLL to a lower frequency clock signal after the memory is in the self refresh mode.

Figure 4:
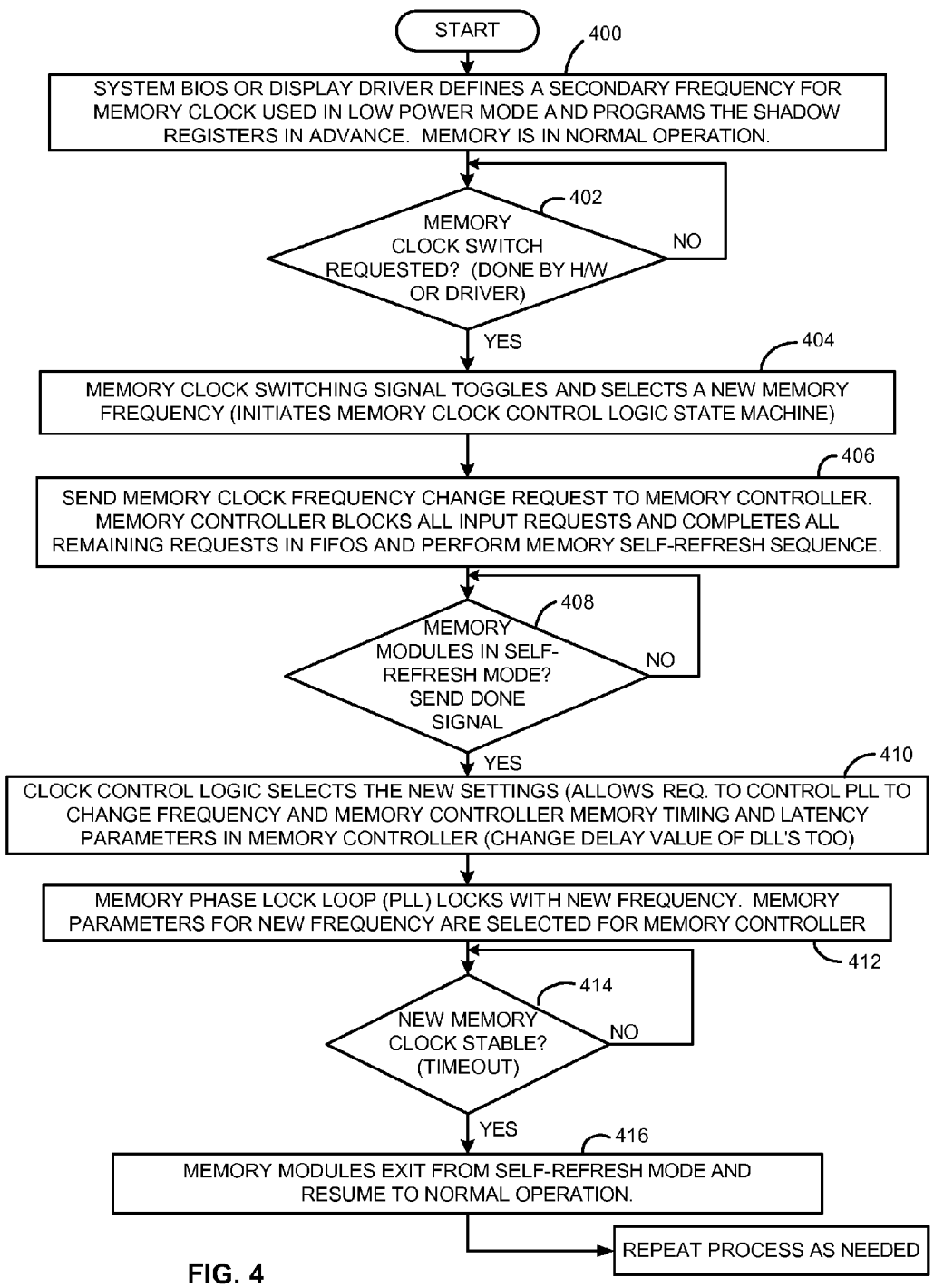
FIG. 4 is a flowchart illustrating one example of a method for reducing power consumption with respect to the block diagram shown in FIG. 3.
Figure 5:
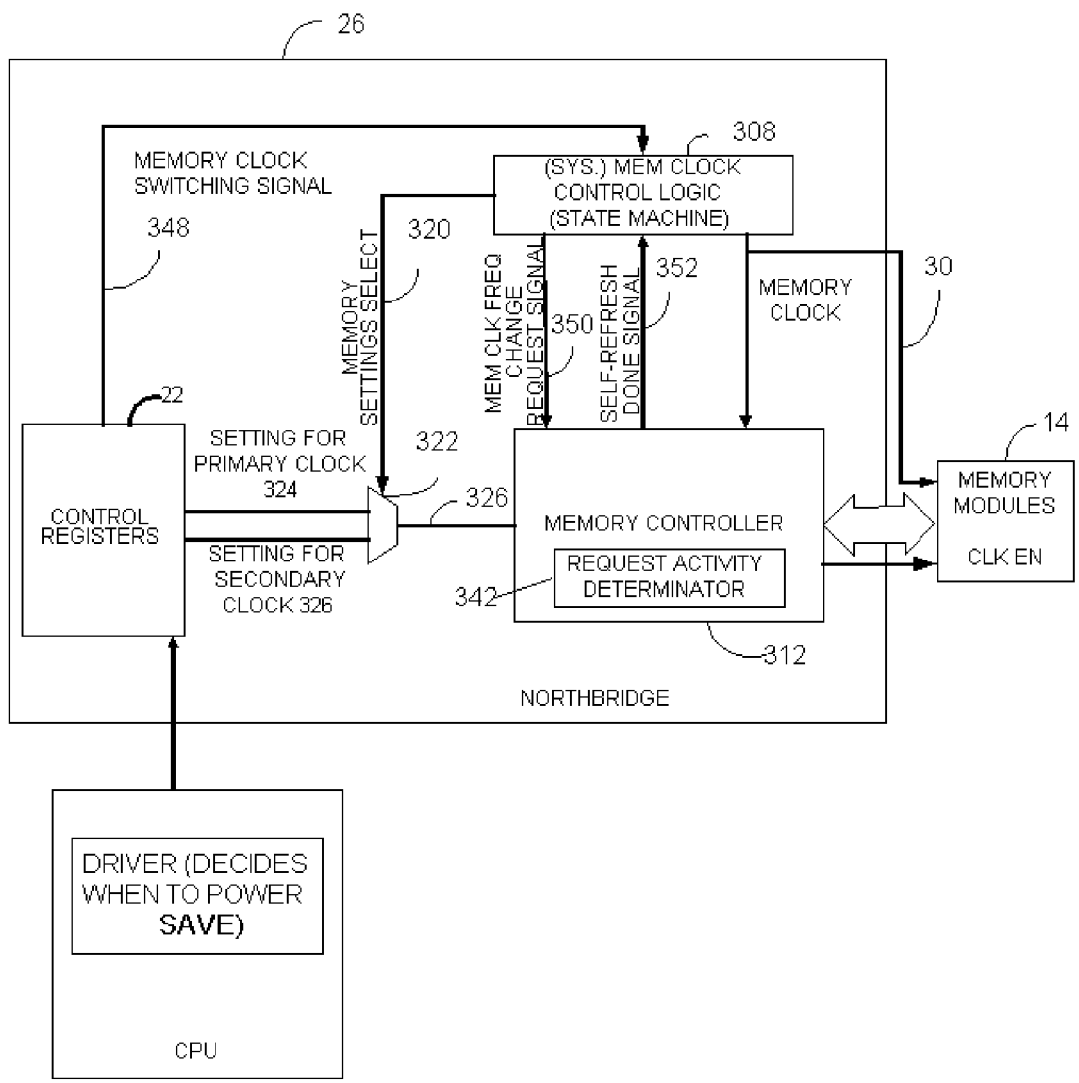
FIG. 5 is a block diagram illustrating an alternative embodiment of a system that employs a power reduction circuit in accordance with one embodiment of the invention.

FIG. 4 illustrates one example of a method for reducing power consumption in a mobile device by, for example, controlling the memory clock frequency signal as described. Referring also to FIG. 3, and as shown in block 400, the method includes the system bios or display driver executing on a CPU setting the lower frequency level for the memory clock by programming the suitable register and also programming the current memory clock frequency to be used during non-power reduction modes. As such, the programming of these registers is done in advance of detecting that a power reduction event has occurred. It will be recognized that any suitable level of power reduction in memory clock frequencies may be used. As such, multiple lower frequency settings may be programmed into the register set as desired.

As shown in block 402, the method includes determining whether the memory clock switching signal 348 or 346 has been activated indicating that a power reduction condition or event has occurred. As noted above, this may be done by the memory request activity detector logic 342 or through the control of a suitable driver executing on the host processor 28, or by any other suitable mechanism. As shown in block 404, the method includes selecting a new lower memory frequency by, for example in this embodiment, using the memory clock switching signal 348. This then causes the state machine of the memory clock control logic 318 to initiate. As shown in block 406, the method includes sending the memory clock frequency change request signal 350 to the memory controller. In response, the memory controller 312 blocks all input requests and completes all remaining memory requests in the memory request FIFOs and performs the memory self refresh sequence to put the memory 14 in the self refresh mode.

As shown in block 408, the memory controller 312 waits and determines if the memory or memory modules are in their self refresh modes. If so, the memory controller sends the self refresh done signal 352 to the memory clock control logic. As shown in block 410, the memory clock control logic 318 then selects the new memory clock frequency setting by generating a memory setting select signal 320 and controls the memory clock PLL 328 to change frequency. It also causes the memory controller timing and latency parameters to change any DLL delays in any memory interface circuit (generally shown as circuit 380 in FIG. 3) and any corresponding DLLs in the memory modules if desired.

As shown in block 412, the memory control logic 318 allows the memory phase lock loop circuit 328 to lock to the new and lower frequency. The memory parameters for the new frequency are selected for the memory controller. Memory parameters may include charge pump and VCO settings for the PLL, frequency dividers for PLL, read latency for memory data read path, and auto-refresh-cycle setting for memory modules.

As shown in block 414, a timeout will be evaluated to determine whether the new memory clock setting is stable. As shown in block 416, after this timeout period lapses, the memory controller 312 causes the memory modules 14 to exit from the self refresh mode and resume normal operation. This process is then repeated each time a power reduction condition is detected.

It will be recognized that although the above operations have been described as lowering the memory clock frequency, that the memory clock frequency may also be increased in a suitable manner. In addition, it will be recognized that the memory clock 30 may also be suitably coupled to each of the memory clients 304, 306 and 308 if desired, or any other suitable circuit as desired.

The above detailed description of the invention and the examples described therein have been presented for the purposes of illustration and description only and not by limitation. Also, the word "coupled" means directly or indirectly coupled to facilitate operation of the circuit. It is therefore contemplated that the present invention cover any and all modifications, variations or equivalents that fall within the spirit and scope of the basic underlying principles disclosed above and claimed herein.

What is claimed is:

1. A method for adjusting power consumption in a device comprising:
   detecting a power reduction condition; and
   in response to detecting the power reduction condition:
   blocking memory accesses to memory by memory access clients;
   completing any remaining memory access requests that are stored in a memory request FIFO;
   placing the memory in a self refresh mode wherein the self refresh mode is independent of a memory clock signal and does not require the memory clock signal;
   thereafter, adjusting by memory clock control logic, while the memory is in the self refresh mode, a frequency of the memory clock signal from a first frequency to a second frequency that is lower than the first frequency but greater than zero; and
   in response to the frequency of the memory clock signal becoming stable, causing the memory to exit from the self refresh mode and restoring the memory to a normal mode wherein the second frequency is used for of lithe memory clock signal.

2. The method of claim 1 wherein placing the memory in a self refresh mode includes causing a memory chip self refresh sequence so data in the memory is self refreshed.

3. The method of claim 1 wherein placing the memory in a self refresh mode includes placing a system memory chip that includes frame buffer memory in self refresh mode so data in the frame buffer memory is self refreshed and wherein the self refresh mode does not require a memory clock signal.

4. The method of claim 1 including programming a register set, by memory clock control logic so that the register set contains a current clock frequency data and a next lower clock frequency data and wherein the method further includes selecting a lower frequency clock signal for controlling the system memory based on contents of the programmed register set.

5. The method of claim 1 wherein the memory is system memory that includes a plurality of memory chips at least one of which contains frame buffer memory accessible by a graphics controller and wherein placing the memory in a self refresh mode includes placing a plurality of system memory chips in self refresh mode, then adjusting a frequency of the memory clock signal to a lower frequency clock signal that is coupled to the plurality of memory chips.

6. A power reduction circuit for a mobile device wherein the mobile device employs a graphics controller that uses at least a portion of system memory as frame buffer memory, comprising:
  memory controller logic operatively coupled to system memory comprising:
  memory clock control logic operative to:
  first provide a variable memory clock signal to the system memory and to place the system memory in a self refresh mode wherein the self refresh mode is independent of a memory clock signal and does not require the memory clock signal;
  then adjust a frequency of the memory clock signal to a different frequency while the memory is in the self refresh mode, wherein the different frequency is greater than zero; and
  in response to the frequency of the memory clock signal becoming stable, cause the memory to exit the self refresh mode and restore the memory to a normal mode that uses the different frequency memory clock signal.

7. The power reduction circuit of claim 6 wherein the memory control logic generates memory clock frequency change request data in response to a power reduction event; receives data representing that a self-refresh mode of the system memory has been properly entered; and adjusts the frequency of the memory clock signal to a lower frequency clock signal.

8. The power reduction circuit of claim 6 wherein the memory controller includes a register set, programmable by the memory clock control logic, that contains a first clock frequency data and a second lower clock frequency data and includes a switching circuit operatively coupled to the register set and operative to select a lower frequency clock signal for controlling the system memory.

9. The power reduction circuit of claim 8 wherein the memory clock control logic includes a programmable phase locked loop circuit that is programmed based on the second lower clock frequency data in the register set.

10. An integrated memory bridge circuit, operatively couplable to system memory, that provides power reduction comprising:
  an integrated graphic controller portion comprising a 3-D rendering engine that uses at least a portion of the system memory as a frame buffer;
  memory controller logic, operatively coupled to the system memory and to the integrated graphics controller, comprising:
  memory clock control logic operative to:
  first provide a variable memory clock signal to the memory and to place the memory in a self refresh mode wherein the self refresh mode is independent of a memory clock signal and does not require the memory clock signal;
  then adjust a frequency of the memory clock signal to a different frequency while the memory is in the self refresh mode, wherein the different frequency is greater than zero; and
  in response to the frequency of the memory clock signal becoming stable, cause the memory to exit the self refresh mode and restore the memory to a normal mode that uses the different frequency memory clock signal.

11. The integrated memory bridge circuit of claim 10 wherein the memory clock control logic is operative to carry out a memory chip self refresh sequence with the system memory to put the system memory in a self refresh mode.

12. The integrated memory bridge circuit of claim 10 wherein the memory controller includes a register set, programmable by the memory clock control logic, that contains a first clock frequency data and a second lower clock frequency data and includes a switching circuit operatively coupled to the register set and operative to select a lower frequency clock signal for controlling the system memory.

13. The integrated memory bridge circuit of claim 10 wherein the memory controller includes memory request activity determination logic that determines whether memory request clients are requesting access to the system memory at a level that allows power consumption reduction for the system memory.

14. A system that includes power consumption reduction logic comprising:
  system memory;
  a first processor;
  an integrated northbridge circuit that provides power reduction, operatively coupled to the first processor and to the system memory so that the first processor can access the memory, the northbridge circuit comprising:
  an integrated second processor having a portion comprising a 3-D rendering engine that uses at least a portion of the system memory as a frame buffer;
  memory controller logic, operatively coupled to the system memory and to the integrated graphics controller, comprising:
  memory clock control logic operative to:
  first provide a variable memory clock signal to the memory and to place the memory in a self refresh mode wherein the self refresh mode is independent of a memory clock signal and does not require the memory clock signal;
  then adjust a frequency of the memory clock signal to a lower frequency while the memory is in the self refresh mode, wherein the different frequency is greater than zero; and
  in response to the frequency of the memory clock signal becoming stable, cause the memory to exit the self refresh mode and restore the memory to a normal mode that uses the lower frequency memory clock signal.

15. The system of claim 14 wherein the memory controller includes a register set, programmable by the first processor, that contains a first clock frequency data and a second lower clock frequency data and includes a switching circuit operatively coupled to the register set and operative to select a lower frequency clock signal for controlling the system memory.

16. The system of claim 14 wherein the memory clock control logic is operative to carry out a memory chip self refresh sequence with the system memory to put the system memory in a self refresh mode.

17. The system of claim 14 wherein the memory controller includes memory request activity determination logic that determines whether memory request clients are requesting access to the system memory at a level that allows power consumption reduction for the system memory.

18. A method for adjusting power consumption in a device comprising:
  detecting a power change condition; and
  responsive to the power change condition, placing the memory in a self refresh mode wherein the self refresh mode is independent of a memory clock signal and does not require the memory clock signal;
  adjusting, by memory clock control logic, a frequency of the memory clock signal from a first frequency to a second frequency that differs from the first frequency but is greater than zero; and
  removing the memory from the self refresh mode to a normal mode that uses the second frequency for the memory clock signal.

19. The method of claim 18 wherein said power change condition comprises one of a power reduction and a power increase condition.

20. The method of claim 19 wherein said second frequency is higher than said first frequency.

\* \* \* \* \*